(12) United States Patent
Hua et al.

(10) Patent No.: US 11,043,861 B2
(45) Date of Patent: Jun. 22, 2021

(54) MAGNETIC FLUX SWITCHING HUB MOTOR HAVING PERMANENT MAGNET ROTOR

(71) Applicant: SOUTHEAST UNIVERSITY, Jiangsu (CN)

(72) Inventors: Wei Hua, Jiangsu (CN); Hengliang Zhang, Jiangsu (CN); Ming Cheng, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 248 days.

(21) Appl. No.: 16/345,734

(22) PCT Filed: Nov. 11, 2016

(86) PCT No.: PCT/CN2016/105502
§ 371 (c)(1),
(2) Date: Apr. 29, 2019

(87) PCT Pub. No.: WO2018/082113
PCT Pub. Date: May 11, 2018

(65) Prior Publication Data
US 2019/0260247 A1    Aug. 22, 2019

(30) Foreign Application Priority Data
Nov. 1, 2016   (CN) .................. 201610967790.X

(51) Int. Cl.
*H02K 7/116* (2006.01)
*H02K 1/27* (2006.01)
(Continued)

(52) U.S. Cl.
CPC .......... *H02K 1/2786* (2013.01); *H02K 7/006* (2013.01); *H02K 7/14* (2013.01); *H02K 21/22* (2013.01); *H02K 2213/03* (2013.01)

(58) Field of Classification Search
CPC .. H02K 1/2786; H02K 21/22; H02K 2213/03; H02K 7/006; H02K 7/116
See application file for complete search history.

(56) References Cited

U.S. PATENT DOCUMENTS

| | | | | |
|---|---|---|---|---|
| 5,343,128 A | * | 8/1994 | Beltrame | H02K 29/08 318/3 |
| 5,369,324 A | * | 11/1994 | Saether | B60K 7/0007 310/156.25 |

(Continued)

FOREIGN PATENT DOCUMENTS

| CN | 203840174 | 9/2014 |
|---|---|---|
| CN | 104201854 | 12/2014 |

(Continued)

OTHER PUBLICATIONS

"International Search Report (Form PCT/ISA/210)", dated Aug. 8, 2017, with English translation thereof, pp. 1-4.

*Primary Examiner* — Dang D Le
(74) *Attorney, Agent, or Firm* — JCIPRNET

(57) ABSTRACT

A magnetic flux switching hub motor having a permanent magnet rotor, includes: a wheel rim, a stator core, an armature winding which is wound on the stator core, and a plurality of rotor units, wherein rotor units are fixed inside the wheel rim, and a rotor unit comprises a permanent magnet and rotor cores which are arranged on two sides of the permanent magnet, the magnetization direction of the permanent magnet being tangential magnetization, and a magnetization direction of each permanent magnet being the same. The motor has the advantages of being high power, and having strong saturation and overload resistance, high reluctance torque, good flux-weakening performance, a broad speed regulation range, a high degree of manufacturing integration, suitability for modular manufacturing processes, and the like.

15 Claims, 7 Drawing Sheets

(51) Int. Cl.
*H02K 7/00* (2006.01)
*H02K 21/22* (2006.01)
*H02K 7/14* (2006.01)

(56) References Cited

U.S. PATENT DOCUMENTS

| | | | | |
|---|---|---|---|---|
| 6,515,390 | B1* | 2/2003 | Lopatinsky | H02K 1/2713 |
| | | | | 310/156.37 |
| 6,661,147 | B2* | 12/2003 | Tajima | H02K 1/276 |
| | | | | 310/216.106 |
| 7,583,001 | B2* | 9/2009 | Lu | H02K 1/148 |
| | | | | 310/156.12 |
| 8,860,272 | B2* | 10/2014 | Smadja | H02K 1/278 |
| | | | | 310/156.38 |
| 2010/0052452 | A1* | 3/2010 | Yoshino | H02K 1/2793 |
| | | | | 310/156.01 |
| 2012/0212085 | A1 | 8/2012 | Fu et al. | |

FOREIGN PATENT DOCUMENTS

| | | |
|---|---|---|
| CN | 104578658 | 4/2015 |
| CN | 204906145 | 12/2015 |

\* cited by examiner

MAGNETIC FLUX SWITCHING HUB MOTOR HAVING PERMANENT MAGNET ROTOR

CROSS-REFERENCE TO RELATED APPLICATION

This is a 371 application of the International PCT application serial no. PCT/CN2016/105502, filed on Nov. 11, 2016, which claims the priority benefits of China Application No. 201610967790.X, filed on Nov. 1, 2016. The entirety of each of the above-mentioned patent applications is hereby incorporated by reference herein and made a part of this specification.

TECHNICAL FIELD

The present invention belongs to the field of motor manufacturing technologies, and more particularly, to a motor having a permanent magnet rotor based on a magnetic flux switching principle.

BACKGROUND

With the deepening of the global energy crisis, the government and society have paid more and more attention to energy-saving and efficient electric vehicles. At present, driving modes of the electric vehicles represented by electric cars mainly include two categories: one category refers to direct driving by a distributed hub motor, which is mainly applied to such fields like an electric bicycle, an electric scooter, and a four-wheel independent drive electric car, and the other category refers to indirect driving by a centralized motor with a gearbox, which is mainly seen in such fields like a power centralized electric car, and a hybrid electric car.

On the other hand, with the rapid growth of the national economy, the car ownership of residents is increased with years, and the issues of urban traffic congestion and parking difficulty are becoming increasingly serious. There is no doubt that the electric bicycle and the electric scooter with high driving flexibility, and the four-wheel independent drive electric car with rich operating freedom, are highly competitive in the market under such environment. As a power source of such electric vehicles, the hub motor naturally attracts extensive attention from industry and academia.

There are many design solutions for the hub motors at present, including a surface-mounted permanent magnet brushless motor, a consequent-pole surface-mounted permanent magnet brushless motor, a switched reluctance motor, a magnetic gear motor, a magnetic flux switching motor having a permanent magnet stator, etc. Because the switched reluctance motor has a too large torque pulsation, the magnetic gear motor has a too complicated structure, and the magnetic flux switching motor having a permanent magnet stator has an insufficient overload resistance, the surface-mounted permanent magnet motor is the most widely used hub motor. However, the armature magnetic field of the surface-mounted permanent magnet motor directly passes through the permanent magnet, so the motor faces with high irreversible demagnetization risks; moreover, the surface-mounted motor has a very small winding inductance, an insufficient flux-weakening capability, and very close a-axis and d-axis inductances, which produces a lower reluctance torque in a flux-weakened condition, and has a poor flux-weakened loading capability, thus directly limiting a speed regulation range of the surface-mounted motor.

For example, the switched reluctance motor is used as the driving motor in some solution, the armature winding is wound on an inner stator core, an outer rotor has a simple salient-pole structure, no permanent magnet and winding are provided, and the outer rotor and the wheel rim need to be connected through welding or other mechanical means, which does not realize integrated design and processing of the rotor and the wheel rim. The torque pulsation of the solution is as high as 17%, which does not effectively solve the problem of large torque pulsation of the switched reluctance motor.

For another example, a position signal detection capability of the motor is improved through the cooperation of a multi-section magnetic steel ring, a magnetic conductive ring and a magnetic induction element in some solution. However, the driving motor in the solution is a traditional surface-mounted permanent magnet brushless motor, and the outer rotor is composed of the magnetic conductive ring and the permanent magnet, the permanent magnet is attached to a surface of the magnetic conductive ring, and fixing glue or a fixing ring needs to be used to ensure that the permanent magnet cannot fall off when the motor is running. In addition, the outer rotor and the wheel rim need to be connected through welding or other mechanical means in the solution, which does not realize integrated design and processing of the rotor and the wheel rim. Moreover, the solution does not solve the problems of narrow speed regulation range and poor flux-weakening capability of the surface-mounted permanent magnet motor.

For another example, an output axis of the driving motor is connected with the wheel rim through a reduction gear in some solution, which does not realize direct transmission of a torque, the existence of a reduction gear reduces an energy transmission efficiency, and a system structure is relatively complex.

SUMMARY

Object of the present invention: the present invention is intended to provide a magnetic flux switching hub motor having a permanent magnet rotor to solve the technical problem in the prior art, so that the motor has the advantages of high power, strong saturation and overload resistance, high reluctance torque, good flux-weakening performance, broad speed regulation range, high degree of manufacturing integration, suitability for modular manufacturing processes, and the like.

Technical solution: a magnetic flux switching hub motor having a permanent magnet rotor comprises a wheel rim, a stator core, an armature winding which is wound on the stator core, and a plurality of rotor units; the rotor units are fixed inside the wheel rim, and the rotor unit comprises a permanent magnet and rotor cores which are arranged on two sides of the permanent magnet; and a magnetization direction of the permanent magnet is tangential magnetization, and a magnetization direction of each permanent magnet is the same.

In a further embodiment, an inside of the wheel rim is provided with a plurality of bosses, a rotor unit accommodating part is formed between adjacent bosses, and the rotor unit is located in the rotor unit accommodating part. One side of the boss adjacent to the rotor core is provided with a positioning bulge or a positioning recess, and the rotor core is correspondingly provided with a positioning recess or a positioning bulge.

Or, inner circular surfaces of the boss and the rotor unit are provided with recesses, and a non-magnetic conductive hoop strip is accommodated in the recesses and presses the rotor unit tightly.

In a further embodiment, one side of the rotor core contacted with the permanent magnet is provided with at least one positioning boot; and the permanent magnet is provided with a groove matched with the positioning boot. A numerical relationship among the rotor core, the permanent magnet and the boss satisfies $N_r=2*N_p=2*N_t$, wherein $N_r$ is a number of the rotor cores, $N_p$ is a number of the magnets, and $N_t$ is a number of the rim bosses. The rotor core and the stator core are made of magnetic conductive materials, and the wheel rim is made of non-magnetic conductive materials. The armature winding is wound on the stator core in a centralized winding manner.

Beneficial effects: the technical solution of the present invention can be implemented to gain the following beneficial effects.

1. By directly embedding the rotor unit on the wheel rim, an electromagnetic torque is transmitted to the wheel rim from the rotor core through the boss inside the wheel rim, and then to a tire, thus improving the reliability of electromagnetic torque transmission.

2. In the embodiment, the rotor is composed of a series of independent rotor units, thus realizing the modular processing of the rotor and improving the manufacturing efficiency.

3. In the solution, the permanent magnet is placed on the rotor, thus releasing a space of a stator armature winding, and solving the problem of supersaturation of a stator tooth of a magnetic flux switching motor having a permanent magnet stator, so that more armature currents can be injected, a saturation resistance capability of the motor is improved, and a torque output capability is improved.

4. A "sandwich" design solution of the rotor core and the permanent magnet enables a difference between the a-axis and d-axis inductances of the motor to be obvious, thus making the difference between the a-axis and d-axis inductances obvious, ensuring that the motor can output higher reluctance torque during flux-weakening operation, and greatly improving the flux-weakened loading capacity of the motor.

5. Due to structural characteristics of the motor, when the rotor runs to the d-axis, the stator tooth directly faces a rotor tooth, resulting in the motor having a larger inductance of the d-axis, so that the flux-weakening capability of the motor is very prominent.

6. Due to excellent flux-weakened loading capacity and flux-weakening capacity, the motor has a broader speed regulation range, and meanwhile, the operation efficiency in a constant power region is improved.

7. Since the motor keeps the magnetic gathering characteristics of traditional motor having a permanent magnet stator, a magnetic flux density of a no-load air gap is higher, and the motor has stronger torque output capability and higher power density.

8. The armature winding is a concentrated winding with short end, small resistance and high efficiency.

9. By adjusting a radial length of the permanent magnet, a magnetic flux density of an air gap can be adjusted, so that the flexibility of motor design is greatly improved and the adaptability to working conditions is strong.

DETAILED DESCRIPTION

Figure 1:
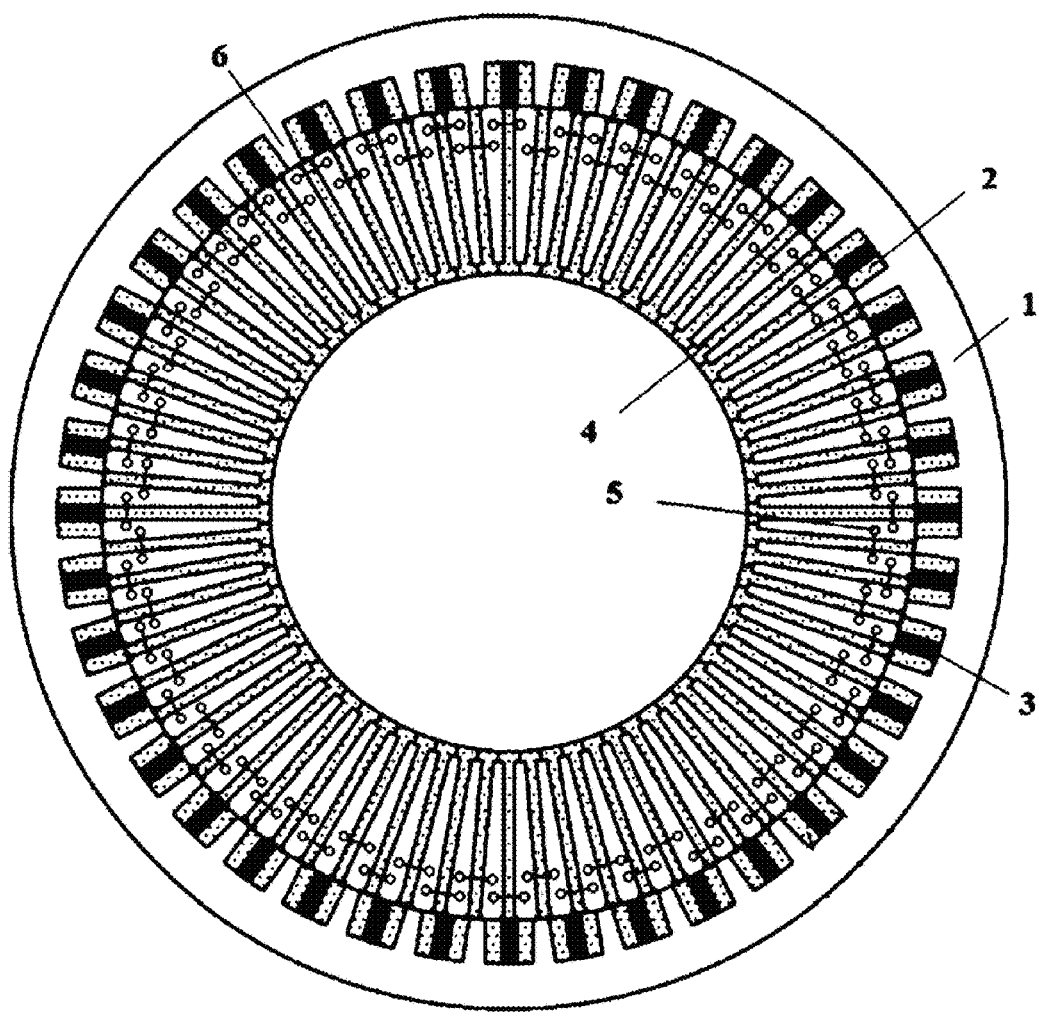
FIG. 1 is a structure diagram of a magnetic flux switching hub motor having a permanent magnet rotor.

As shown in FIG. 1, in a magnetic flux switching hub motor having a permanent magnet rotor of the present invention, the magnetic flux switching motor having a permanent magnet rotor is used as a driving motor, and a stator and a rotor of the motor are arranged in the form of an outer rotor—an inner stator, i.e., the stator is arranged at an inside, and the rotor is arranged at an outer periphery.

Figure 2:
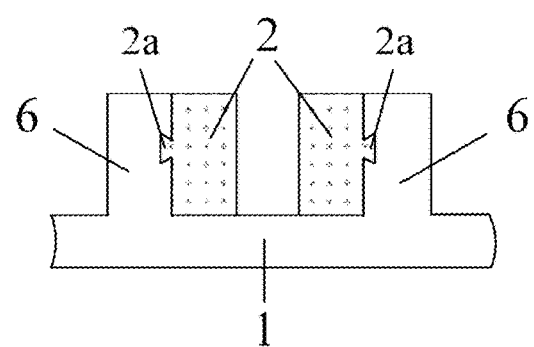
FIG. 2 is a collaboration diagram of a wheel rim and a rotor core.

Among various hub motor solutions currently available, communication modes of a motor rotor and a wheel rim are as follows: the outer rotor and the wheel rim are directly communicated through welding; and an inner rotor is indirectly communicated with the wheel rim through a gear box. The magnetic flux switching hub motor having a permanent magnet rotor of the present invention abandons the two types of modes above. In the embodiment shown in FIG. 2, a rotor unit is directly embedded on a wheel rim 1, and a specific processing method is that: a rotor core 2 and a wheel rim boss 6 are provided with dovetail grooves 2a matched with each other, and the rotor core is fixed on the wheel rim 1 through matching the dovetail grooves.

Compared with the existing welding communication mode, the communication mode in the present invention may not generate unreliable communication in the forms of air hole, slag inclusion and the like, and the torque transmission reliability is higher under a high speed and large torque output working condition; and compared with the indirect communication of the existing gear box, the communication mode in the present invention avoids energy loss caused by gear friction and other factors, and has higher energy transmission efficiency.

Figure 3:
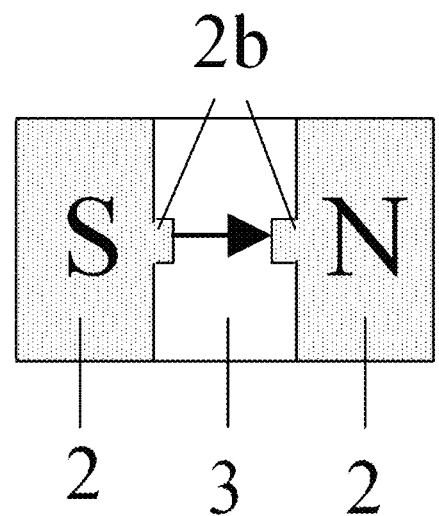
FIG. 3 is a structure diagram of a rotor unit.
Figure 4:
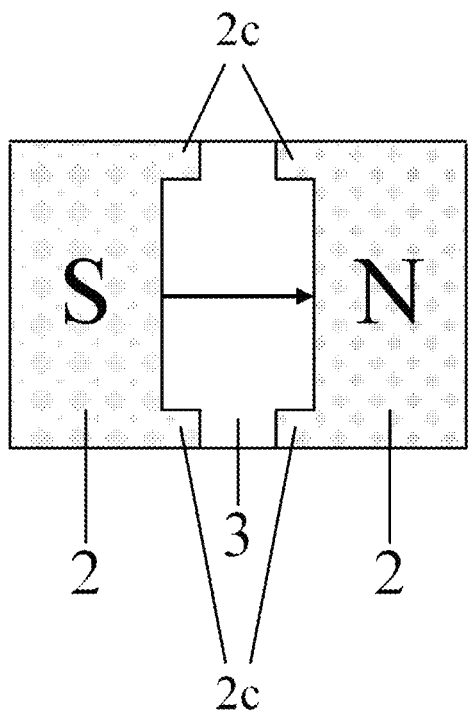
FIG. 4 is a structure diagram of another rotor unit.

As shown in FIG. 3, the rotor core of the present invention is formed by laminating silicon steel sheets, a first positioning boot 2b is arranged in the middle of the rotor core for fixing a permanent magnet 3, and the permanent magnet is sandwiched between two rotor cores. A matching form of the rotor core and the permanent magnet can also be the form shown in FIG. 4, i.e., two sides of the rotor core are provided with second positioning boots 2c, and the permanent magnet is sandwiched between the rotor cores. Each rotor unit realizes modular processing, which improves the manufacturing efficiency.

A motor stator is composed of a stator core 4 and an armature winding 5; and the motor rotor is a yoke-free structure and is composed of a plurality of rotor units, and each rotor unit is composed of two rotor cores and a tangentially magnetized permanent magnet sandwiched between the rotor cores. It shall be emphasized that a magnetizing direction of each permanent magnet in the magnetic flux switching motor having a permanent magnet rotor is the same, which is different from a relative magnetizing mode of the permanent magnet in the magnetic flux switching motor having a permanent magnet stator.

Compared with the magnetic flux switching hub motor having a permanent magnet stator, the magnetic flux switching hub motor having a permanent magnet rotor of the present invention has the permanent magnet placed on the rotor, which increase a space between a stator armature winding and the stator tooth. Therefore, under the condition of the same current density, more armature currents can be injected, thus improving the torque output capacity of the motor. Moreover, the stator tooth becomes wider, which solves the problem of supersaturation of the stator tooth of the magnetic flux switching motor having a permanent magnet stator, and improves the saturation resistance capability of the motor, thus further improving the overload capability of the magnetic flux switching motor.

Based on an assembly logic of the wheel rim boss and the rotor unit in the magnetic flux switching hub motor having a permanent magnet rotor of the present invention mentioned above, $N_r$ is a number of the rotor cores, $N_p$ is a number of the permanent magnets, and $N_t$ is a number of the wheel rim bosses, and a relationship of "$N_r=2*N_p=2*N_t$" needs to be satisfied.

Figure 5:
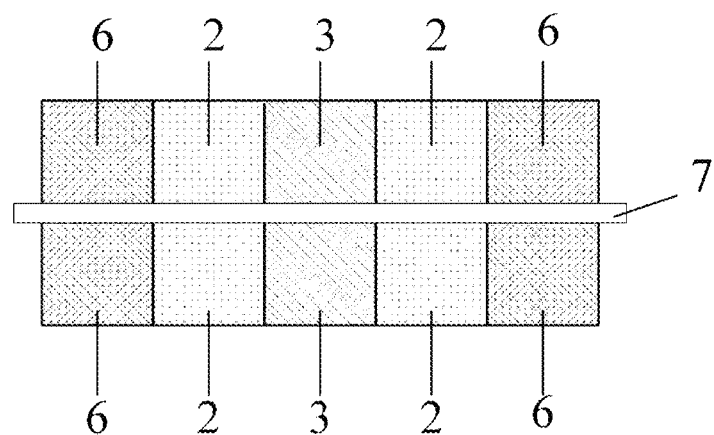
FIG. 5 is a collaboration diagram of a non-magnetic conductive hoop strip with the rotor unit and a wheel rim boss.

As shown in FIG. 5, in order to further fix the communication between the rotor unit and the wheel rim, inner circular surfaces (breathing sides) of the wheel rim boss, the rotor core and the permanent magnet are provided with recesses for placing a non-magnetic conductive hoop strip 7, and the non-magnetic conductive hoop strip is used to press the rotor unit tightly. After tightening the rotor unit, air gaps among the rotor core, the permanent magnet, the wheel rim and the non-magnetic conductive hoop strip are filled with anaerobic glue to ensure the tightness of installation.

Figure 6:
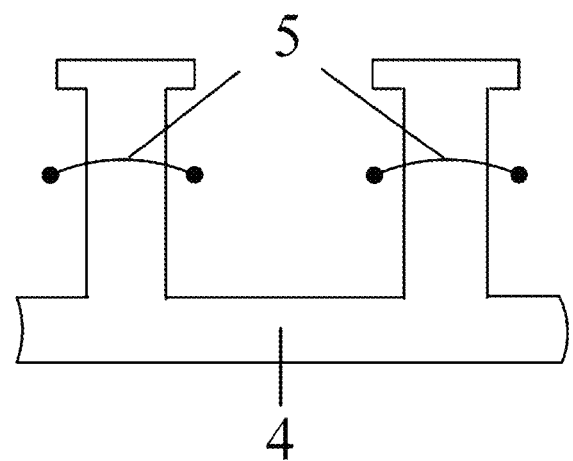
FIG. 6 is a diagram of a stator winding.

According to the magnetic flux switching hub motor having a permanent magnet rotor of the present invention, a centralized winding method is used in the stator winding, i.e., each winding coil only surrounds one stator tooth, as shown in FIG. 6. A resistance R of each-phase winding can be calculated according to a following formula (1), $$R = N\rho \frac{L_{av}}{S_{av}} \quad (1)$$

wherein, N is a number of series turns of each-phase winding, $\rho$ is a resistivity of a wire, $L_{av}$ is an average length of the winding, and $S_{av}$ is an average cross-sectional area of the winding. Since the use of a centralized winding mode may not change the number N of series turns of each-phase winding, and the resistivity p of the wire is not change, the average cross-sectional area $S_{av}$ of the winding is not change, but the average length $L_{av}$ of the winding will be shortened, the resistance R of each phase winding is relatively low.

Moreover, a calculation formula of a motor copper consumption $p_{copper}$ is $$p_{copper}=mI^2R \quad (2)$$

wherein, m is a number of motor phases, I is an effective value of a phase current, and R is a resistance value of each phase. From the foregoing, since the resistance R of each phase of the motor of the present invention is lower, the motor copper consumption of the present invention is less when the number m of the motor phases and the effective value I of the phase current are not changed.

Figure 7:
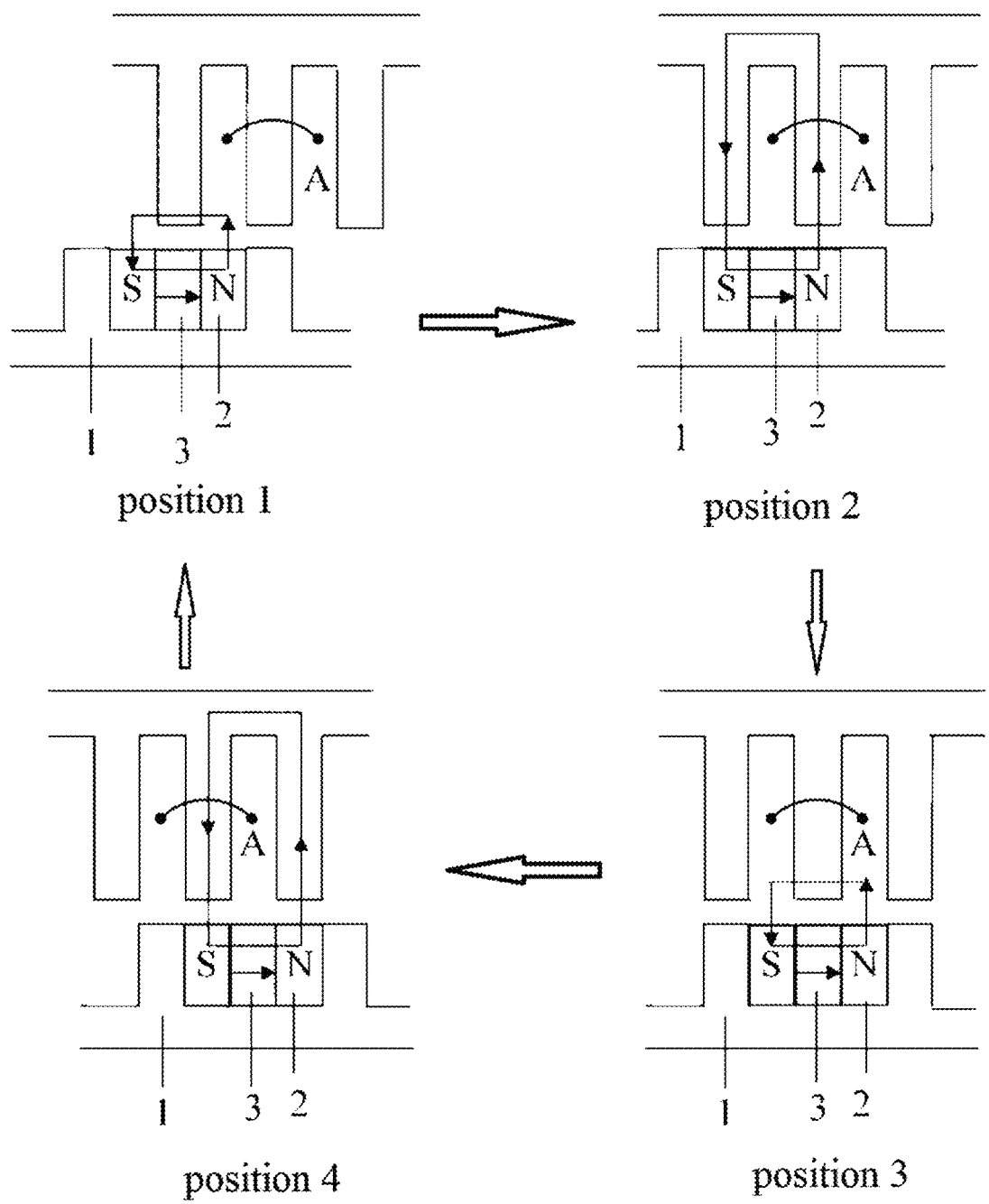
FIG. 7 is an operating principle diagram of the magnetic flux switching hub motor having a permanent magnet rotor.

As shown in FIG. 7, an operating principle of the magnetic flux switching hub motor having a permanent magnet rotor of the present invention is described. Taking a winding A as an example, when the winding A is located at a position 1, the stator tooth where the winding A is located directly faces a non-magnetic conductive boss; at the moment, a permanent magnet magnetic linkage hardly passes through the winding A, and the permanent magnet magnetic linkage turned in the winding A is 0, i.e., an a-axis position; then, the motor runs to a position 2; at the moment, the stator tooth where the winding A is located directly faces the rotor tooth, a permanent magnet magnetic flux passes through the winding A and returns to the permanent magnet through other stator teeth, and at the moment, the turn linkage in the winding A has a maximum N-polarity permanent magnet magnetic linkage, i.e., a d-axis position; next, the motor runs to a position 3; at the moment, the stator tooth where the winding A is located directly faces the permanent magnet, a permanent magnet magnetic circuit passes through the air gap, a tooth tip of the stator tooth where the winding A is located is closed, and the permanent magnet magnetic linkage of the turn linkage in the winding A is 0, i.e., the a-axis position; then, the motor runs to a position 4, at the moment, the stator tooth where the winding A is located directly faces the rotor tooth, the permanent magnet magnetic flux passes through other stator teeth and returns to the permanent magnet after passing through the stator tooth where the winding A is located, and at the moment, the turn linkage in the winding A has a maximum S-polarity permanent magnet magnetic linkage, i.e., the d-axis position; and finally, the motor will run to the position 1 again to complete a complete electrical cycle. With continuous operation of the motor, the position of the rotor will be continuously changed according to a rule of "position 1→position 2→position 3→position 4→position 1", the permanent magnet magnetic linkage in the winding A is also changed according to a rule of "0→N→0→S→0" correspondingly, corresponding counter electromotive force (emf) may be induced in the winding A, and the motor may generate the electromagnetic torque when appropriate armature current is introduced.

Figure 8:
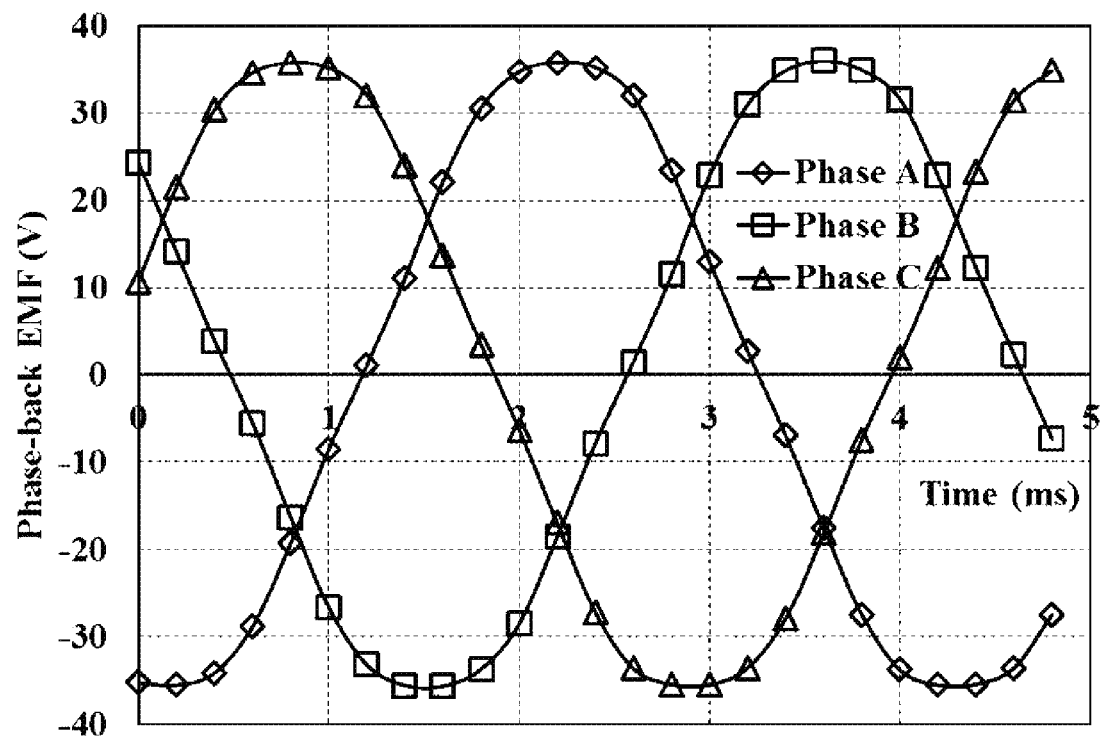
FIG. 8 is a three-phase counter electromotive force (emf) waveform diagram of the magnetic flux switching hub motor having a permanent magnet rotor.

FIG. 8 is a simulation waveform of a counter emf of a magnetic flux switching hub motor having a permanent magnet rotor according to the present invention. As can be seen from FIG. 8, a sine degree of a waveform of the counter emf of the motor is quite high.

A calculation formula of an electromagnetic torque $T_{em}$ of synchronous motor is $$T_{em}=3/2P_T\psi_m i_q+3/2P_T(L_d-L_q)i_d i_q \quad (3)$$

wherein, $P_r$ is a number of pole pairs of the motor, $\psi_m$ is a value of the permanent magnet magnetic linkage, $i_q$ is a current of the a-axis, $i_d$ is a current of the d-axis, $L_q$ is an inductance of the a-axis, and $L_d$ is an inductance of the d-axis. The first item in the formula (3) is the electromagnetic torque generated by the interaction between the permanent magnet magnetic linkage and an armature magnetic linkage, and the second item is the reluctance torque generated by the reluctance fluctuation of the motor. When the motor runs at a rated speed and below, the current of the d-axis is 0, and at the moment, the motor only outputs the permanent magnet torque; when the motor runs in a high-speed region requiring weakening magnet, $i_d$ of the motor is not value 0, at the moment, the motor will generate the reluctance torque, and if the inductance of the a-axis is greater than the inductance of the d-axis, the reluctance torque will be a positive value, and this part of reluctance torque will improve the loading capacity of the flux-weakening region of the motor.

Figure 9:
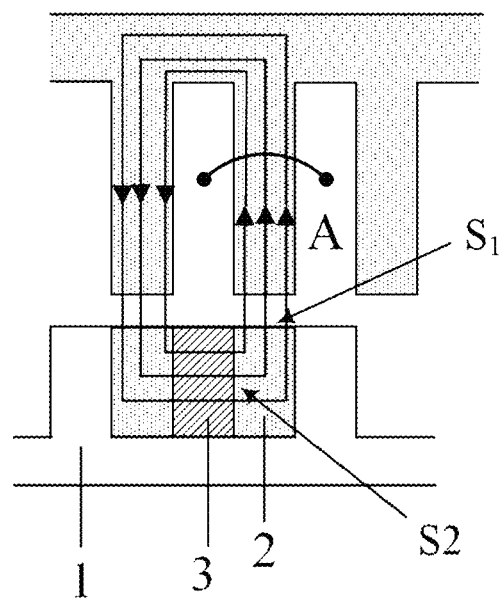
FIG. 9 is a diagram illustrating a magnetic gathering characteristic of the magnetic flux switching hub motor having a permanent magnet rotor.

FIG. 9 illustrates a magnetic gathering mechanism of the magnetic flux switching hub motor having a permanent magnet rotor according to the present invention. FIG. 9 shows a diagram of a magnetic circuit under a condition that the stator tooth directly faces the rotor tooth, i.e., the rotor is on the d-axis. The permanent magnet magnetic flux $\Phi_m$ passes through a surface $S_2$ of the permanent magnet, enters the air gap from a surface $S_1$ of the rotor tooth, and then is turned in the stator winding. Thus, it can be known that a ratio of a magnetic flux density $B_1$ on a surface of the rotor tooth to a magnetic flux density $B_2$ on a surface of the permanent magnet is:

$$\frac{B_1}{B_2} = \frac{\Phi_m}{S_{c1}} * \frac{S_{c2}}{\Phi_m} = \frac{S_{c2}}{S_{c1}} \quad (4)$$

wherein, $S_{c1}$ is a radial surface area of the rotor tooth, and $S_{c2}$ is a tangential surface area of the permanent magnet. Moreover, $$S_{c1} = r_w * 1 \quad (5)$$

$$S_{c2} = l_{pm} * 1 \quad (6)$$

wherein, $r_w$ is a width of the rotor tooth, $l_{pm}$ is a radial length of the permanent magnet, and I is an effective axis length of the motor. Therefore, $$\frac{B_1}{B_2} = \frac{l_{pm}}{r_w}. \quad (7)$$

Therefore, the magnetic flux switching hub motor having a permanent magnet rotor of the present invention can adjust a magnitude of the magnetic flux density of the air gap of the motor through adjusting the radial length of the permanent magnet and the width of the rotor tooth, which cannot be realized by a hub motor having a surface-mounted permanent magnet rotor. By adjusting the magnitude of the magnetic flux density of the air gap of the motor, the motor can be suitable for more working conditions.

Since the hub motor usually needs to work under the condition of low speed and high torque, according to the formula (3), when the number of the pole pairs of the motor and the armature current are not changed, the magnetic flux switching hub motor having a permanent magnet rotor of the present invention can obtain a larger permanent magnet magnetic linkage $\psi_m$ through setting a larger ratio $r_w$ of the radial length $l_{pm}$ of the permanent magnet to the width of the rotor tooth, thus further generating larger electromagnetic torque output.

Figure 10:
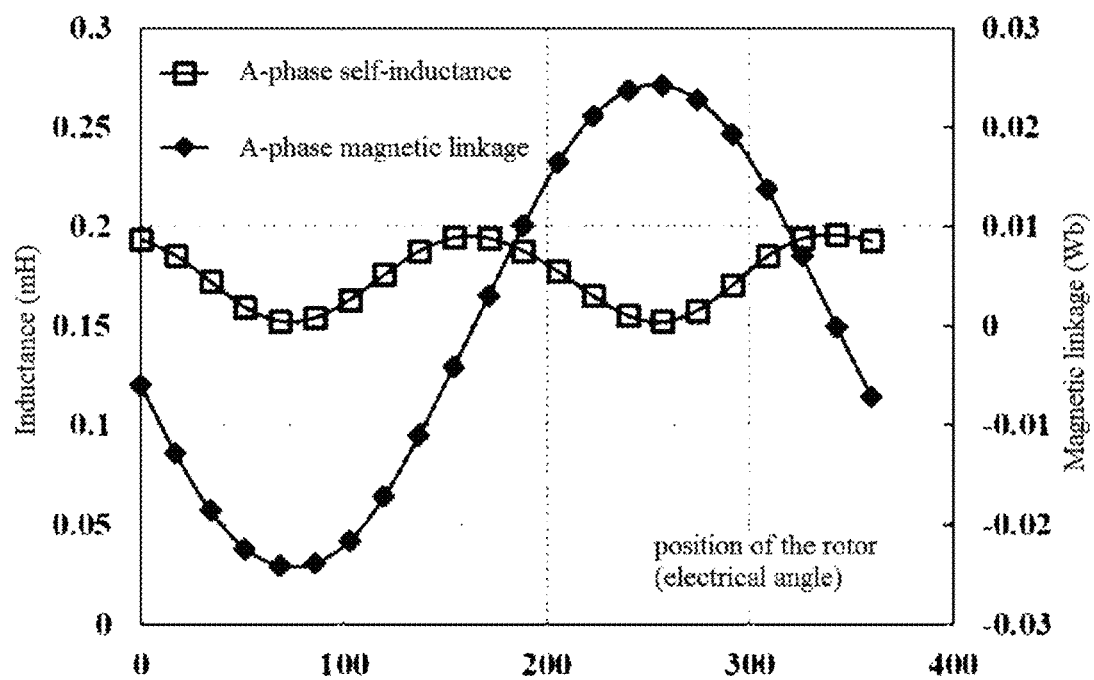
FIG. 10 is a waveform diagram of a magnetic linkage and an inductance of the magnetic flux switching hub motor having a permanent magnet rotor.
Figure 11:
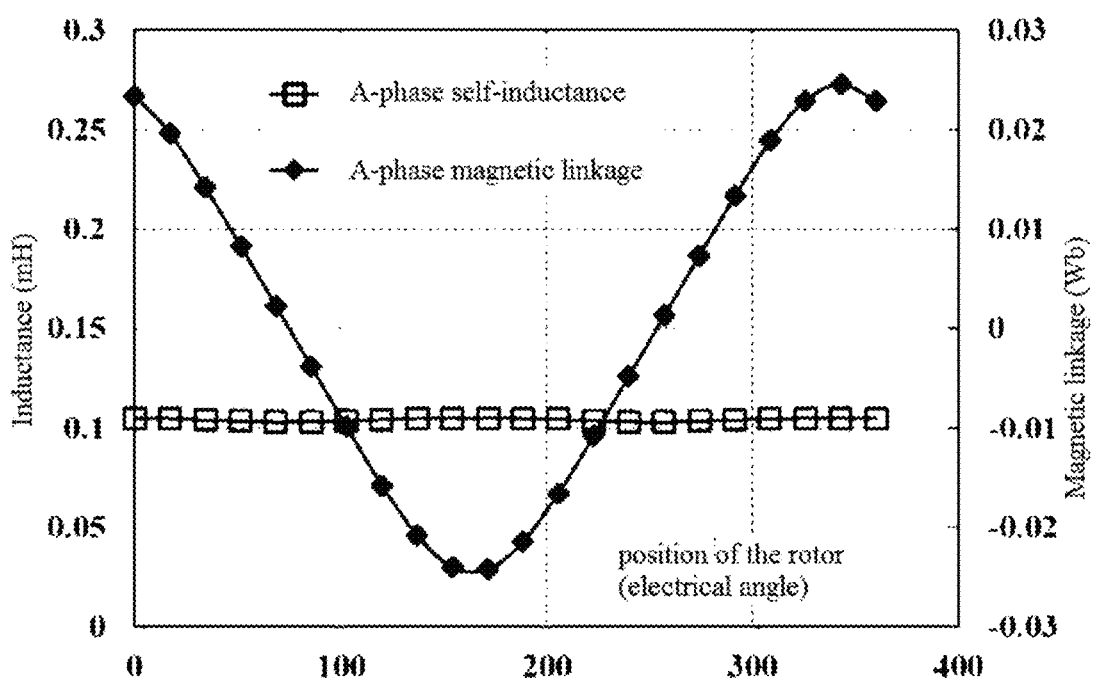
FIG. 11 is a waveform diagram of an inductance and a magnetic linkage of an existing hub motor having a surface-mounted permanent magnet rotor.

FIG. 10 and FIG. 11 compare the inductance and magnetic linkage characteristics of two hub motors of the same size, FIG. 10 is a waveform of the inductance and the magnetic linkage of the magnetic flux switching hub motor having a permanent magnet rotor of the present invention, and FIG. 11 is a waveform of the inductance and the magnetic linkage of the existing hub motor having a surface-mounted permanent magnet rotor.

It can be seen from FIG. 10 that, in the magnetic flux switching hub motor having a permanent magnet rotor of the present invention: 1. when the winding magnetic linkage is at two extreme points (d-axis), the winding inductance is the smallest; and 2. when the winding magnetic linkage is 0 (a-axis), the winding inductance is the largest, and the inductance of the a-axis is significantly different from the inductance of the d-axis, and the inductance of the a-axis is larger than the inductance of the d-axis. These two inductance characteristics correspond to the operating principle of the magnetic flux switching hub motor having a permanent magnet rotor of the present invention described above.

It can be seen from FIG. 11 that in the existing hub motor having a surface-mounted permanent magnet rotor, the winding inductance is hardly changed whether the winding magnetic linkage is at the two extreme points (d-axis) or 0 (a-axis).

By comparing FIG. 10 with FIG. 11, it can be known that the inductance $L_q$ of the a-axis of the magnetic flux switching hub motor having a permanent magnet rotor of the present invention is twice that of the existing hub motor having a surface-mounted permanent magnet rotor, and the inductance $L_d$ of the d-axis is 1.5 times that of the existing hub motor having a surface-mounted permanent magnet rotor. It can be known from the formula (3) that the magnetic flux switching hub motor having a permanent magnet rotor of the present invention may generate higher forward reluctance torque in a high-speed flux-weakening region, and the high-speed flux-weakened loading capacity is obviously stronger than that of the existing hub motor having a surface-mounted permanent magnet rotor.

A flux-weakening coefficient $k_{fw}$ of the permanent magnet motor is $$k_{fw} = \frac{\psi_m}{(\psi_m - I_d L_d)} \quad (8)$$

wherein, $I_d$ is a flux-weakening current. It can be known from FIG. 10 and FIG. 11 a values of the permanent magnet magnetic linkage of the magnetic flux switching hub motor having a permanent magnet rotor of the present invention is similar to that of the existing hub motor having a surface-mounted permanent magnet rotor, however, the inductance $L_d$ of the d-axis of the magnetic flux switching hub motor having a permanent magnet rotor of the present invention is 1.5 times that of the existing hub motor having a surface-mounted permanent magnet rotor, so that under the condition of the same flux-weakening current $I_d$, the flux-weakening capability of the magnetic flux switching hub motor having a permanent magnet rotor of the present invention is significantly stronger than that of the existing hub motor having a surface-mounted permanent magnet rotor.

From the foregoing, the magnetic flux switching hub motor having a permanent magnet rotor of the present invention has excellent flux-weakened loading capacity and flux-weakening capacity, so that the magnetic flux switching hub motor having a permanent magnet rotor of the present invention has a broader speed regulation range, and since the motor has a larger inductance of the d-axis, the flux-weakening current is smaller and the copper consumption generated by the flux-weakening current is smaller while ensuring the same magnitude of the flux-weakening magnetic linkage as that of the existing hub motor having a surface-mounted permanent magnet rotor. Moreover, due to the existence of higher reluctance torque, the output torque of the motor is larger. Therefore, the magnetic flux switching hub motor having a permanent magnet rotor of the present invention has better efficiency characteristics during high-speed flux-weakening operation.

In addition, since the magnetic flux switching hub motor having a permanent magnet rotor of the present invention has stronger reluctance torque output capability, a maximum torque output current angle of the motor is not 0, but in the flux-weakening region.

Figure 12:
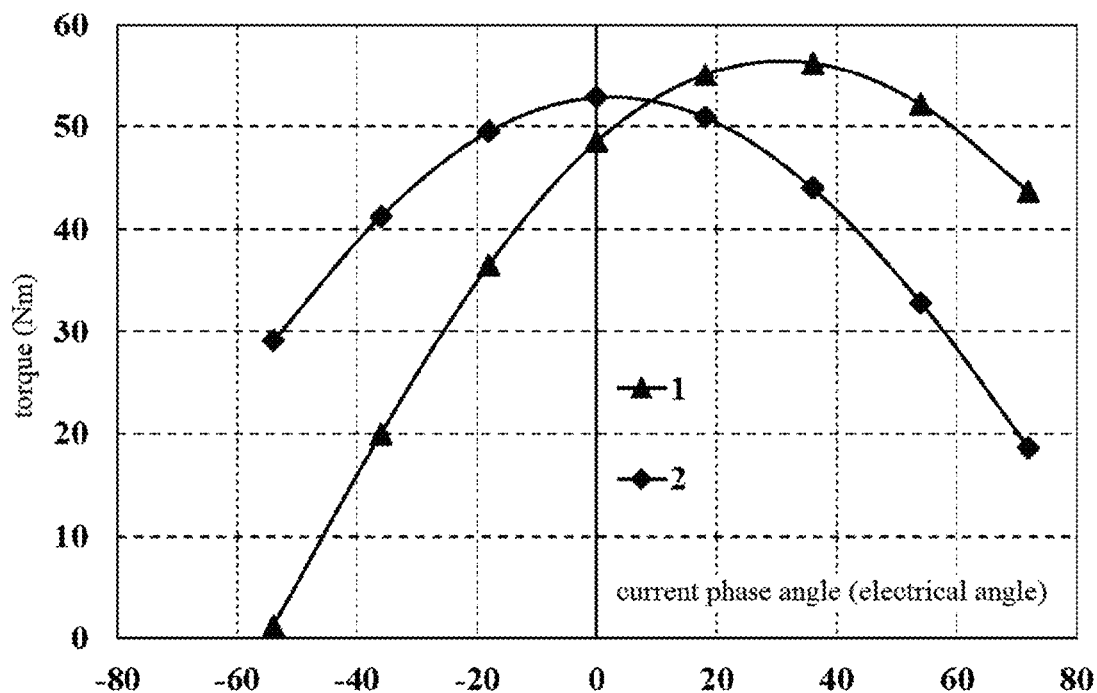
FIG. 12 is a "torque-phase angle" curve of the magnetic flux switching hub motor having a permanent magnet rotor and the existing hub motor having a surface-mounted permanent magnet rotor.

FIG. 12 is a "torque-phase angle" curve of the magnetic flux switching hub motor having a permanent magnet rotor of the present invention and the existing hub motor having a surface-mounted permanent magnet rotor under the condition of applying the same current density, wherein a curve 1 is the magnetic flux switching hub motor having a permanent magnet rotor of the present invention, and a curve 2 is the existing hub motor having a surface-mounted permanent magnet rotor. It can be known from FIG. 12 that the maximum torque output current angle of the magnetic flux switching hub motor having a permanent magnet rotor of the present invention is 36°, while the maximum torque output current angle of the existing hub motor having a surface-mounted permanent magnet rotor is 00. When the motor works in a high-speed flux-weakening state, i.e., the current phase angle is a positive value, the torque output capability of the magnetic flux switching hub motor having a permanent magnet rotor of the present invention is obviously stronger than that of the existing hub motor having a surface-mounted permanent magnet rotor.

Figure 13:
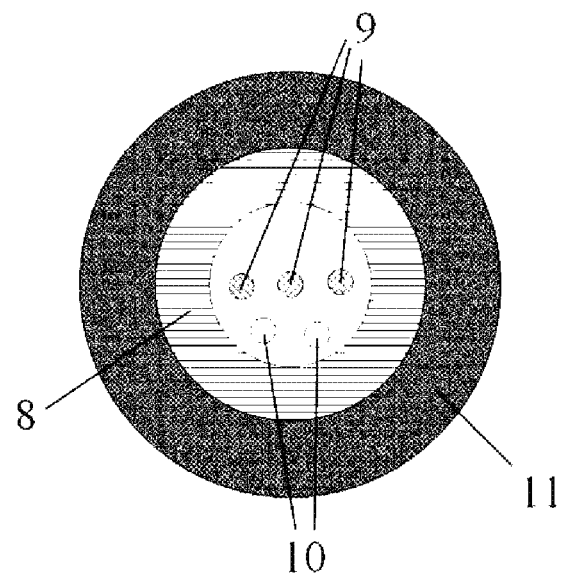
FIG. 13 is a diagram of a stator axis of the magnetic flux switching hub motor having a permanent magnet rotor.

As shown in FIG. 13, a stator side of the magnetic flux switching hub motor having a permanent magnet rotor of the present invention may be provided with a water channel for cooling. A stator axis 8 is sleeved with a hub bearing 11 for supporting a motor wheel rim; the stator axis 8 has a hollow structure inside, and a three-phase electric wire 9 of the hub motor and a water inlet and outlet pipe 10 of a cooling system both pass through the inside of the stator axis 8.

In a word, the magnetic flux switching hub motor having a permanent magnet rotor of the present invention comprises three parts of a wheel rim, an outer rotor and an inner stator. A boss structure is arranged inside the wheel rim for positioning and fixing the rotor unit embedded on the wheel rim to transmit electromagnetic torque. The outer rotor is composed of a series of rotor units, each rotor unit is formed by assembling two rotor cores and a tangentially magnetized permanent magnet, and the permanent magnet can be ferrite or neodymium iron boron. Due to the use of the arrangement mode of the inner stator and the outer rotor, the winding inductance of the d-axis of the magnetic flux switching hub motor with a novel structure is larger, and the flux-weakening capability of the motor is obviously stronger than that of the surface-mounted permanent magnet motor; and moreover, the winding inductance of the a-axis is significantly different from the winding inductance of the d-axis, the reluctance torque of the motor during flux-weakening operation is significantly improved, and the loading capacity is stronger than that of surface-mounted permanent magnet motor. All aspects of performance are obviously better than the surface-mounted permanent magnet motor. The design that the rotor unit is directly embedded in the wheel rim improves the degree of integration of the motor manufacturing and facilitates the modular manufacturing of the motor. The inner stator is composed of an armature winding and a stator core, and the armature winding is a concentrated winding. When the stator tooth is aligned with different rotor teeth, a direction of the permanent magnet magnetic flux generated by the permanent magnet passing through each concentrated armature coil may be different, thus generating a magnetic flux switching effect, resulting in the permanent magnet magnetic linkage turned in each phase armature winding being bipolar. The key point of the present invention is that the permanent magnet is placed on the rotor, the magnetic gathering characteristics of the magnetic flux switching motor are kept while releasing the space of the armature winding, and the magnetic flux density of the air gap can be adjusted by adjusting the radial length of the permanent magnet; and the rotor unit is directly embedded in the wheel rim, and the electromagnetic torque is directly transmitted to the wheel rim, so that the reliability is high, and the modular design of the rotor unit simplifies the assembling process of the rotor. Since the motor has the magnetic gathering effect, the magnetic flux density of the no-load air gap is higher, and the motor has stronger torque output capability and higher power density; and meanwhile, the armature winding is a concentrated winding with short end, small resistance and high efficiency. In addition, an armature reaction magnetic flux and the permanent magnet magnetic flux are perpendicular to each other in space, and the magnetic circuit is communicated in parallel, thus ensuring the stronger demagnetization resistance of the motor.

The preferred embodiments of the present invention are described in detail above. However, the present invention is not limited to the specific details in the embodiments above. Various equivalent transformations can be made to the technical solutions of the present invention without departing from the scope of the technical concept of the present invention, and these equivalent transformations shall all fall within the protection scope of the present invention. In addition, it should be noted that various specific technical features described in the detailed embodiments above can be combined in any suitable way in case of no contradiction.

What is claimed is:

1. A magnetic flux switching hub motor having a permanent magnet rotor, comprising a wheel rim, a stator core, an armature winding which is wound on the stator core, and a plurality of rotor units, wherein the plurality of rotor units are fixed inside the wheel rim, and each of the rotor unit comprises a permanent magnet and rotor cores which are arranged on two sides of the permanent magnet; a magnetization direction of the permanent magnet is tangential magnetization, and the magnetization direction of each of the permanent magnet is the same,
    wherein an inside of the wheel rim is provided with a plurality of bosses, a rotor unit accommodating part is formed between adjacent bosses, and the rotor unit is located in the rotor unit accommodating part.

2. The magnetic flux switching hub motor having a permanent magnet rotor according to claim 1, wherein one side of the boss adjacent to the rotor core is provided with a positioning bulge or a positioning recess, and the rotor core is correspondingly provided with a positioning recess or a positioning bulge.

3. The magnetic flux switching hub motor having a permanent magnet rotor according to claim 2, wherein one side of the rotor core contacted with the permanent magnet is provided with at least one positioning boot; and the permanent magnet is provided with a groove matched with the positioning boot.

4. The magnetic flux switching hub motor having a permanent magnet rotor according to claim 3, wherein a numerical relationship among the rotor core, the permanent magnet and the boss satisfies $N_r=2*N_p=2*N_t$, wherein $N_r$ is a number of the rotor cores, $N_p$ is a number of the magnets, and $N_t$ is a number of the rim bosses.

5. The magnetic flux switching hub motor having a permanent magnet rotor according to claim 3, wherein the rotor core and the stator core are made of magnetic conductive materials, and the wheel rim is made of non-magnetic conductive materials.

6. The magnetic flux switching hub motor having a permanent magnet rotor according to claim 2, wherein the armature winding is wound on the stator core in a centralized winding manner.

7. The magnetic flux switching hub motor having a permanent magnet rotor according to claim 1, wherein inner circular surfaces of the boss and the rotor unit are provided with recesses, and a non-magnetic conductive hoop strip is accommodated in the recesses and presses the rotor unit tightly.

8. The magnetic flux switching hub motor having a permanent magnet rotor according to claim 7, wherein one side of the rotor core contacted with the permanent magnet is provided with at least one positioning boot; and the permanent magnet is provided with a groove matched with the positioning boot.

9. The magnetic flux switching hub motor having a permanent magnet rotor according to claim 8, wherein a numerical relationship among the rotor core, the permanent magnet and the boss satisfies $N_r=2*N_p=2*N_t$, wherein $N_r$ is a number of the rotor cores, $N_p$ is a number of the magnets, and $N_t$ is a number of the rim bosses.

10. The magnetic flux switching hub motor having a permanent magnet rotor according to claim 8, wherein the rotor core and the stator core are made of magnetic conductive materials, and the wheel rim is made of non-magnetic conductive materials.

11. The magnetic flux switching hub motor having a permanent magnet rotor according to claim 7, wherein the armature winding is wound on the stator core in a centralized winding manner.

12. The magnetic flux switching hub motor having a permanent magnet rotor according to claim 1, wherein one side of the rotor core contacted with the permanent magnet is provided with at least one positioning boot; and the permanent magnet is provided with a groove matched with the positioning boot.

13. The magnetic flux switching hub motor having a permanent magnet rotor according to claim 12, wherein a numerical relationship among the rotor core, the permanent magnet and the boss satisfies $N_r=2*N_p=2*N_t$, wherein $N_r$ is a number of the rotor cores, $N_p$ is a number of the magnets, and $N_t$ is a number of the rim bosses.

14. The magnetic flux switching hub motor having a permanent magnet rotor according to claim 12, wherein the rotor core and the stator core are made of magnetic conductive materials, and the wheel rim is made of non-magnetic conductive materials.

15. The magnetic flux switching hub motor having a permanent magnet rotor according to claim 1, wherein the armature winding is wound on the stator core in a centralized winding manner.

* * * * *